United States Patent [19]
Parr

[11] 4,090,294
[45] May 23, 1978

[54] JOINTING OR TERMINATING PLASTICS SHEATHED ELECTRIC CABLE

[75] Inventor: David Turner Parr, Croft, near Warrington, England

[73] Assignee: BICC Limited, London, England

[21] Appl. No.: 669,330

[22] Filed: Mar. 22, 1976

[51] Int. Cl.² .......................... B29C 5/00; B29F 1/00
[52] U.S. Cl. ...................................... 29/628; 29/460; 156/49; 264/154; 264/261; 264/263; 264/272; 264/275; 264/328
[58] Field of Search ............ 264/36, 37, 259, 261–263, 264/265, 271, 272, 275, 328, 329, 154, 248, DIG. 65; 425/114, 116, 501, 502, 242 R, 392, 395; 156/49, 157, 252, 502, 245, 293, 303.1, 242; 174/65 R, 84 R; 29/460, 628, 630 F

[56] References Cited

U.S. PATENT DOCUMENTS

| 2,892,013 | 6/1959 | Gomberg | 174/153 G |
| 2,930,835 | 3/1960 | Bollmeier | 156/49 |
| 2,947,033 | 8/1960 | Ryan | 264/36 |
| 3,521,823 | 7/1970 | Van Horsen | 264/262 |

FOREIGN PATENT DOCUMENTS 221,764  9/1957  Australia .............................. 156/49

*Primary Examiner*—Willard E. Hoag
*Attorney, Agent, or Firm*—Buell, Blenko & Ziesenheim

[57] ABSTRACT

In effecting a fluid-tight seal between a plastics part of a cable joint or termination enclosure and the plastics sheath of an electric cable a hole is formed in the wall of said part to form a cable entry of a size appropriate to the cable and a length of the cable is passed through the cable entry so formed. A mould is assembled about the cable adjacent a surface of said part, which mould embraces the cable and has ports for the admission and discharge of molten thermoplastics material, and the mould is temporarily secured to said part of the enclosure. Molten thermoplastics material is injected into the interior of the mould through said admission port and, after a sufficient quantity of molten thermoplastics material has passed through the mould and out of the discharge port to soften the surfaces of the cable sheath and said part of the enclosure, the mould is sealed and the molten thermoplastics material in the mould is permitted or caused to cool and make an effective bond with the cable sheath and with said part of the enclosure.

13 Claims, 1 Drawing Figure

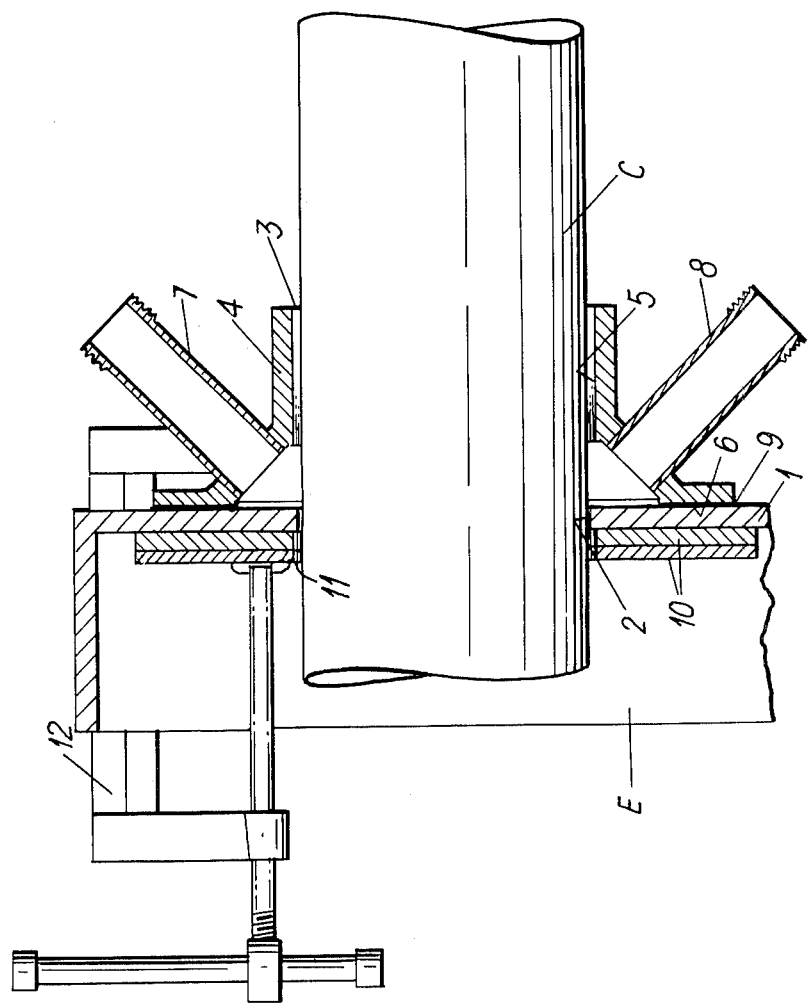

JOINTING OR TERMINATING PLASTICS SHEATHED ELECTRIC CABLE

This invention relates to jointing or terminating electric cables insulated or sheathed with thermoplastics material and is particularly concerned with electric cable joints or terminations of the kind in which the connections between cable conductors or the terminated end of a cable are or is surrounded by a joint enclosure that makes a fluid-tight joint with the thermoplastics sheath, insulation or other covering of each cable connected at the joint or of the or each cable at the termination. The sheath, insulation or other covering of cable with which an enclosure makes a fluid-tight joint is hereinafter included in the term "sheath".

According to the present invention we provide a method of making a joint between plastics sheathed cables, or a termination of a plastics sheathed cable, of the kind in which connections between the cable conductors or the terminated end of the or each cable conductor are or is surrounded by a joint or termination enclosure divided transversely of the axis of at least one of the cables into at least two separately formed parts secured together in a fluid-tight manner, at least one of said separately formed parts of the enclosure being of plastics material and being sealed in a fluid-tight manner to the plastics sheath of the cable or at least one of the cables, wherein the fluid-tight seal between said part of the enclosure and the cable sheath is effected by cutting or otherwise forming a hole in the wall of said part to form a cable entry of a size appropriate to the cable; passing a length of the cable through the cable entry so formed; assembling about the cable adjacent a surface, preferably the outer surface, of said part a mould which embraces the cable and has ports for the admission and discharge of molten thermoplastics material; clamping or otherwise temporarily securing the mould to said part; injecting into the interior of the mould through said admission port molten thermoplastics material that is compatible with the plastics materials of the cables sheath and of said part of the enclosure and that is at a temperature appreciably above the softening point of said materials; and, after a sufficient quantity of molten thermoplastics material has passed through the mould and out of the discharge port to soften the surfaces of the cable sheath and said part of the enclosure, sealing the mould, and permitting or causing the molten thermoplastics material in the mould to cool and make an effective bond with the cable sheath and with said part of the enclosure.

Preferably after sealing the mould the volume of the sealed space within the mould is reduced, for instance by means of a plunger connected to at least one of the ports in the mould, to compensate for contraction of the thermoplastics material on cooling. In some cases the source of supply can be used for this purpose but preferably the source of supply of molten thermoplastics material is disconnected from the mould before the mould is sealed.

By a plastics material that is compatible with the plastics material of the sheath is meant a material that will make an effective bond with, and will not have any deleterious effect on, the material of the sheath, or vice versa.

The joint or termination enclosure is preferably of elongate form and the part of the enclosure in which the hole to form the cable entry is cut or otherwise formed is preferably a separately formed end wall of the elongate enclosure. Preferably the surface of the end wall against which the mould is clamped is of planar form and preferably this planar surface lies in a plane that will be radial to the axis of a cable passing through the cable entry.

The method of the present invention is especially, but not exclusively, suitable for use when it is required to connect a cable to an existing joint between at least two cables, or to an existing termination of a cable, for example in a local telephone cable network where it is required to connect an additional cable to an existing telephone cable installation. In this case the joint or termination enclosure is opened up to expose the existing joint or termination, a hole is cut or otherwise formed in an end wall or other part of the enclosure, a length of the additional cable is passed through the cable entry so formed and its conductor or conductors is or are connected to a conductor or conductors of one or more of the cables or of the cable of the existing joint or termination, the cable is then sealed to the end wall or other part of the enclosure by the method as hereinbefore described, and the enclosure is then re-closed.

The invention also includes, for use in the method as hereinbefore described, a tubular mould having ports for the admission and discharge of molten thermoplastics material, which mould is divided longitudinally into at least two separately formed parts which together define, at one end of the mould, a bore of a shape and size complementary to those of the sheath of a cable to be jointed and, at the other end of the mould for engaging an end wall or other part of the joint enclosure, an annular surface which extends transversely of the axis of the mould and whose radially inner boundary is spaced radially outwardly of the internal surface of said bore.

Preferably said annular surface lies in a plane substantially normal to the axis of the tubular mould. The mould preferably consists of two separately formed parts, the port for admission of thermoplastics material being in one part and the port for discharge of thermoplastics material being in the other part.

To reduce the risk that transfer of heat from the mould to that part of the end wall or other part of the enclosure engaged by the or each clamp will so soften said part that deformation of the end wall may occur, a layer of thermal insulating material may be inserted between said annular surface of the mould and the surface of the end wall or other part of the enclosure against which the mould is to be clamped.

With a view to ensuring that the clamping force employed when the mould is temporarily secured to the end wall or other part of the enclosure is distributed over a substantial proportion of the internal surface of the end wall or other part of the enclosure, at least one apertured metal plate divided transversely into two parts is preferably clamped against said internal surface. If desired, a pair of apertured metal plates transversely divided into two parts and arranged face-to-face may be employed to distribute the clamping force, for example each of the pair of plates comprising two semi-annular parts, and one or each of the abutting surfaces of the pair of plates may have upstanding pins which engage in complementary-shaped holes in the other of the abutting surfaces to locate one of the pair of two-part plates with respect to the other, preferably in such a way that the diametrically extending edges of one of the pair of two-part plates are substantially normal to the diametrically extending edges of the other pair of two-part plates.

In a first alternative arrangement, a plate of metal or of other suitable reinforcing material may be embedded in, or secured to the internal surface of, the end wall or other part of the enclosure to ensure that the clamping force is distributed over a substantial proportion of the end wall or other part of the enclosure. Where the end wall or other part of the enclosure has a peripheral wall to which, say, a joint sleeve may subsequently be bonded, this peripheral wall may have a ring of metal, or other suitable reinforcing material, embedded in it or secured to its internal surface.

In a second alternative arrangement a tubular member, having a relatively thick wall and divided longitudinally into at least two parts, is applied about the cable to be jointed on the side of the end wall or other part of the enclosure remote from the mould and is clamped against the end wall or other part of the enclosure by a clamp or clamps engaging the end of the tubular member remote from the end wall or other part of the enclosure. The end face of the tubular member may have blind holes or may be otherwise shaped to assist in location of the clamp or clamps. The parts of the tubular member may be secured together by at least one circumferential clip which may engage in an annular groove in the tubular member. Where the end wall or other part of the enclosure has a peripheral wall extending lengthwise along the enclosure, to facilitate clamping of the mould the tubular member preferably has a length greater than that of the peripheral wall.

The or each clamp employed to secure the mould to the external surface of the end wall or other part of the enclosure may also serve to locate the mould with respect to the end wall, or other part of the enclosure, by means of upstanding pins and/or holes on or in the parts of the or each clamp which abut the remote surfaces of the mould and end wall or other part of the enclosure, which pins engage in complementary-shaped holes in, and/or which holes are engaged by complementary-shaped upstanding pins on, said remote surfaces.

The invention is further illustrated by a description, by way of example, of the preferred method of connecting an additional telephone cable to an existing straight joint between two plastics sheathed telephone cables with reference to the accompanying drawing which shows a sectional side view of one end wall of the joint enclosure through which a length of the additional cable is to be passed and to which the cable is to be sealed.

The existing straight joint between the two plastics sheathed telephone cables is housed in a joint enclosure of thermoplastics material which is divided transversely of the cable axes into three separately formed parts consisting of two substantially identical end parts sealed to the plastics sheaths of the jointed cables and a central sleeve extending between and sealed to the end parts. In order to connect the additional telephone cable to the existing joint the seals between the central sleeve and the end parts are broken and the sleeve is drawn back over the end part opposite to that through which the additional cable is to be passed so that the existing conductor joints are exposed.

As will be seen on referring to the drawing, a hole 2 is now cut in the end wall 1 of the other end part, a length of the additional telephone cable C is passed through the cable entry so formed and the conductors of the cable are connected to conductors of the cables of the existing joint. A seal is now effected between the cable C and the end wall 1. To this end a convolute wrapping 3 of tape is built up on the cable C at a predetermined distance from the desired position of the end wall on the cable and a two-part tubular mould 4 having at one end a bore 5 and, at the other end, a radially extending annular surface 6 is applied to the cable with the convolute wrapping 3 of tape positioned in the bore. One part of the mould 4 has an inlet port 7 and the other part of the mould has an outlet port 8. The end wall 1 is now positioned to abut the annular surface 6 of the mould and, in the case where the mould is of metal or other material of high thermal conductivity, a layer 9 of thermal insulating material is interposed between the annular surface and the external surface of the end wall. A pair of two-part annular metal plates 10 are applied to the internal surface of the end wall 1, a convolute wrapping 11 of tape having previously been applied to the cable adjacent the internal surface of the end wall to fill the space between the cable and the radially inner boundary of the metal plates. The mould 4 is clamped to the end wall 1 by a clamp 12, the metal plates 10 serving to distribute the clamping force over a substantial proportion of the internal surface of the end wall.

Molten thermoplastics material identical with the plastics material of the cable sheath and joint enclosure and at a temperature appreciably above their softening temperatures is now injected into the interior of the mould 4 through the inlet port 7 and is allowed to flow out of the outlet port 8 until a sufficient quantity of molten thermoplastics material has passed through the mould and out of the port 8 to soften the surfaces of the cable sheath and the part of the end wall within the mould. During this operation the layer 9 of thermal insulating material reduces the risk that heat will be transferred from the mould to that part of the end wall engaged by the clamp which will so soften that deformation of the end wall may occur. The convoluted wrapping 11 of tape prevents collapse of the end wall 1 in the gap between the cable and the radially inner edges of the metal plates 10 during the moulding process.

The source of supply of molten thermoplastics material is now disconnected from the mould, plungers (not shown) are secured to the admission and discharge ports and the molten thermoplastics material in the mould is permitted to cool and make an effective joint with the cable sheath and with the end wall, the volume of the mould being gradually reduced by means of the plungers during the cooling period to compensate for contraction of the thermoplastics material on cooling. Alternatively, a plunger used to force molten thermoplastics material into the mould may be used to reduce the volume of the mould.

The clamp 12 is now removed, the mould 4 and metal plates 10 are removed and the central sleeve of the joint enclosure slid back in place and re-sealed to the end parts of the enclosure.

What I claim as my invention is:

1. A method of connecting a cable comprising at least one conductor to an existing joint between plastics sheathed cables, or to an existing termination of a plastics sheathed cable, of the kind in which connections between the cable conductors of the terminated end of the cable conductor is surrounded by an enclosure divided transversely of the axis of at least one of the cables into at least two separately formed parts secured together in a fluid-tight manner, at least one of said separately formed parts of the enclosure being of plastics material and being sealed in a fluid-tight manner to the plastics sheath of the terminated cable or at least one of the jointed cables, wherein the enclosure is opened up to expose the existing joint or termination; a hole is formed in the wall of said plastics part of the enclosure to form a cable entry of a size appropriate to the additional cable; a length of the additional cable is passed through the cable entry so formed and its conductor is connected to at least one conductor of at least one of the cables or of the cable of the existing joint or termination; a mould is assembled about the additional cable adjacent a surface of said part, which mould embraces the additional cable and has ports for the admission and discharge of molten thermoplastics material; the mould is temporarily secured to said part; molten thermoplastics material is injected into the interior of the mould through said admission port, which thermoplastics material is compatible with the plastics materials of the cable sheath and said part of the enclosure and is at a temperature appreciably above the softening point of said materials; after a sufficient quantity of molten thermoplastics material has passed through the mould and out of the discharge port to soften the surfaces of the cable sheath and said part of the enclosure, the mould is sealed and the molten thermoplastics material in the mould is permitted or caused to cool and make an effective bond with the cable sheath and with said part of the enclosure; and the enclosure is re-closed.

2. A method as claimed in claim 1, wherein the source of supply of molten thermoplastics material is disconnected from the mould before the mould is sealed.

3. A method as claimed in claim 1, wherein a tubular member, having a relatively thick wall and divided longitudinally into at least two parts, is applied about the cable to be jointed on the side of said part of the enclosure remote from the mould and is clamped against said part of the enclosure by at least one clamp engaging the end of the tubular member remote from said part of the enclosure.

4. A method as claimed in claim 1, wherein, after the mould has been sealed, the volume of the sealed space within the mould is reduced to compensate for contraction of the thermoplastics material on cooling.

5. A method as claimed in claim 4, wherein the volume of the sealed space within the mould is reduced by means of a plunger connected to at least one of the ports in the mould.

6. A method as claimed in claim 1, wherein the mould is built up of at least two separately formed parts which together define, at one end of the mould, a bore having an internal diameter slightly greater than the external diameter of the cable sheath and, at the other end of the mould, a transversely extending annular surface of a shape complementary to that of the part of the enclosure against which the mould is to be clamped, the radially inner boundary of said annular surface being spaced radially outwardly of the cable sheath.

7. A method as claimed in claim 6, wherein a layer of thermal insulating material is inserted between said annular surface of the mould and the surface of said part of the enclosure.

8. A method as claimed in claim 1, wherein at least one apertured metal plate divided transversely into two parts is clamped against the surface of said part of the enclosure remote from the mould to distribute the clamping force over a substantial proportion of said surface.

9. A method as claimed in claim 8, wherein a pair of apertured metal plates divided diametrically into two parts are arranged face-to-face, at least one of the abutting surfaces of the pair of plates having upstanding pins which engage in complementary-shaped holes in the other of the abutting surfaces to locate one of the pair of two-part plates with respect to the other.

10. A method as claimed in claim 1, wherein the enclosure is of elongate form and the part of the enclosure in which the hole to form the cable entry is formed is a separately formed end wall of the elongate enclosure.

11. A method as claimed in claim 10, wherein the surface of the end wall against which the mould is clamped is the outer surface.

12. A method as claimed in claim 10, wherein the surface of the end wall against which the mould is clamped is of planar form.

13. A method as claimed in claim 12, wherein said planar surface of the end wall lies in a plane that will be radial to the axis of a cable passing through the cable entry.

* * * * *